(12) United States Patent
Lin

(10) Patent No.: US 11,404,218 B2
(45) Date of Patent: *Aug. 2, 2022

(54) CAPACITOR ELEMENT AND METHOD FOR MANUFACTURING THE SAME

(71) Applicant: APAQ TECHNOLOGY CO., LTD., Miaoli County (TW)

(72) Inventor: Chieh Lin, Hsinchu County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 75 days.

This patent is subject to a terminal disclaimer.

(21) Appl. No.: 16/987,753

(22) Filed: Aug. 7, 2020

(65) Prior Publication Data

US 2021/0287857 A1     Sep. 16, 2021

(30) Foreign Application Priority Data

Mar. 16, 2020   (TW) .................................. 109108518

(51) Int. Cl.
*H01G 13/00* (2013.01)
*H01G 9/00* (2006.01)
*H01G 13/04* (2006.01)

(52) U.S. Cl.
CPC ......... *H01G 9/0036* (2013.01); *H01G 13/003* (2013.01); *H01G 13/04* (2013.01)

(58) Field of Classification Search
None
See application file for complete search history.

(56) References Cited

U.S. PATENT DOCUMENTS

| | | | | |
|---|---|---|---|---|
| 8,064,192 B2 * | 11/2011 | Kuranuki | ............... | H01G 9/012 361/525 |
| 8,482,902 B2 * | 7/2013 | Ishida | ...................... | H01G 9/15 361/523 |
| 10,147,551 B2 * | 12/2018 | Intelmann | ............ | H01G 9/0036 |
| 10,504,657 B2 * | 12/2019 | Vilc | ...................... | H01G 9/012 |
| 10,923,289 B2 * | 2/2021 | Wu | ........................ | H01G 9/055 |
| 10,950,390 B2 * | 3/2021 | Wu | ....................... | H01G 9/0425 |
| 10,991,515 B2 * | 4/2021 | Harada | ................... | H01G 9/055 |
| 11,145,467 B2 * | 10/2021 | Tsutsumi | ................. | H01G 9/10 |
| 11,183,342 B2 * | 11/2021 | Uher | ......................... | H01G 9/07 |
| 2010/0165547 A1 * | 7/2010 | Kuranuki | .................. | H01G 9/15 361/525 |
| 2011/0157776 A1 * | 6/2011 | Ishida | ...................... | H01G 9/15 361/524 |
| 2012/0044615 A1 * | 2/2012 | Takahashi | .............. | H01G 9/028 361/528 |

(Continued)

*Primary Examiner* — Dion R. Ferguson
(74) *Attorney, Agent, or Firm* — Li & Cai Intellectual Property (USA) Office

(57) ABSTRACT

A capacitor element and a method of manufacturing the same are provided. The method includes steps of: providing a metal foil having an oxide layer formed on an outer surface of the metal foil; forming a surrounding barrier layer onto the oxide layer so as to divide the outer surface of the oxide layer into a first part outer surface and a second part outer surface separated from each other; forming a base layer onto the oxide layer so as to partially encapsulate the oxide layer; cleaning the base layer by a cleaning solution and then drying the base layer; forming a conductive polymer layer onto the base layer; and forming a conductive paste layer onto the conductive polymer layer.

11 Claims, 4 Drawing Sheets

(56) References Cited

U.S. PATENT DOCUMENTS

| | | | | |
|---|---|---|---|---|
| 2012/0057275 A1* | 3/2012 | Intelmann | ................ | H01G 9/15 |
| | | | | 361/523 |
| 2012/0206859 A1* | 8/2012 | Chacko | ................ | H01G 9/0425 |
| | | | | 361/529 |
| 2013/0229751 A1* | 9/2013 | Petrzilek | .............. | H01G 9/0525 |
| | | | | 361/525 |
| 2013/0258555 A1* | 10/2013 | Chiu | ........................ | H01G 9/15 |
| | | | | 361/528 |
| 2017/0352491 A1* | 12/2017 | Chen | ........................ | H01G 9/025 |
| 2018/0082794 A1* | 3/2018 | Millman | .............. | H01G 9/0036 |
| 2020/0098526 A1* | 3/2020 | Wu | ........................ | H01G 9/15 |
| 2020/0098527 A1* | 3/2020 | Wu | ........................ | H01G 9/14 |
| 2021/0287856 A1* | 9/2021 | Lin | ........................ | C09D 5/002 |
| 2021/0287857 A1* | 9/2021 | Lin | ........................ | H01G 13/04 |

\* cited by examiner

CAPACITOR ELEMENT AND METHOD FOR MANUFACTURING THE SAME

CROSS-REFERENCE TO RELATED PATENT APPLICATION

This application claims the benefit of priority to Taiwan Patent Application No. 109108518, filed on Mar. 16, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a capacitor element and a method for manufacturing the same, and more particularly to a capacitor element cleaned by a cleaning solution and a method for manufacturing the same.

BACKGROUND OF THE DISCLOSURE

Capacitors are widely used in applications such as consumer appliances, computers, power supplies, communication products, vehicles, etc., and have become one of the indispensable elements in electronic devices. The main functions of the capacitors include filtering, bypassing, rectifying, coupling, decoupling, phase inverting, etc. The capacitors can be in different types according to different materials and purposes, including aluminum electrolytic capacitors, tantalum electrolytic capacitors, laminated ceramic capacitors, and thin film capacitors. In conventional technology, with the advantages of being small in size, having large capacitance and excellent frequency characteristics, solid electrolytic capacitors are used to decouple power circuits of central processing units. In the solid electrolytic capacitors, liquid electrolytic solutions are replaced with solid electrolytes to act as cathodes. On the other hand, with the advantages of having high conductivity and being easily manufactured, conductive polymers have been widely used as materials of the cathodes of the solid electrolytic capacitors.

The conductive polymers, which can be used in the cathodes of the solid electrolytic capacitors, include polyaniline (PAni), polypyrrole (PPy), polythiophene (PTh), and derivatives thereof, in which poly(3,4-ethylenedioxythiophene):polystyrene sulfonic acid (PEDOT:PSS) composite has excellent conductivity and a lower polymerization rate compared to other polymers such as the PAni and the PPy. Therefore, PEDOT:PSS composite can be polymerized at room temperature, thereby rendering an easier preparation process. In addition, compared to other polymers, PEDOT:PSS composite has better weather resistance and heat resistance. Furthermore, PEDOT:PSS composite has good dispersibility, low production cost, high transparency, and excellent processability. Therefore, using PEDOT:PSS composite as a component of the conductive polymer layer on the cathodes of the capacitors would bring about a great improvement in electrical properties of the capacitors.

However, a capacitor element and a method for manufacturing the capacitor element are still needed to improve the overall electrical properties of the capacitor.

SUMMARY OF THE DISCLOSURE

In response to the above-referenced technical inadequacies, the present disclosure provides a capacitor element and a method for manufacturing the capacitor element.

In one aspect, the present disclosure provides a method for manufacturing a capacitor element. The method includes the following steps of providing a metal foil having an oxide layer formed on an outer surface of the metal foil; forming a surrounding barrier layer onto the oxide layer, and the surrounding barrier layer being surroundingly formed on an outer surface of the oxide layer so as to divide the outer surface of the oxide layer into a first part outer surface and a second part outer surface separated from each other; forming a base layer onto the second part outer surface of the oxide layer so as to partially encapsulate the oxide layer; preparing a cleaning solution containing an amine and an acid; cleaning the base layer by the cleaning solution and then drying the base layer; forming a conductive polymer layer onto the base layer, and forming a conductive paste layer onto the conductive polymer layer, and the conductive paste layer including a silver paste layer.

In certain embodiments, the present disclosure provides the method for manufacturing the capacitor element. A material of the base layer is synthesized by chemical polymerization, and the material of the base layer is polydioxyethylthiophene, self-doped polydioxyethylthiophene, polydioxyethyl-thiophene:polystyrenesulfonic acid composite or any combination thereof.

In certain embodiments, the cleaning solution further includes an aminobenzoic acid derivative, and the aminobenzoic acid derivative is at least one of aminobenzoic acid and aminophthalic acid.

In certain embodiments, the aminobenzoic acid derivative is selected from the group consisting of: para-aminobenzoic acid, meta-aminobenzoic acid, ortho-aminobenzoic acid, para-dimethylaminobenzoic acid, 2-aminoterephthalic acid, 3-aminophthalic acid, 5-aminoisophthalic acid, and any combination thereof.

In certain embodiments, the amine has at least two amino groups, the acid is a weak acid, and a molar ratio of the amine to the acid ranges from 1:0.3 to 1:0.7.

In certain embodiments, the amine is at least one selected from the group consisting of: a diamine having 2 to 10 carbon atoms, a triamine having 2 to 10 carbon atoms, a cyclic amine having 4 to 12 carbon atoms, an aromatic amine having 4 to 12 carbon atoms, and salts thereof.

In certain embodiments, the amine is at least one selected from the group consisting of: ethylenediamine, propylenediamine, butanediamine, pentanediamine, hexamethylenediamine, heptanediamine, octanediamine, nonanediamine, decanediamine, tetramethylethylenediamine, tetramethylpropanediamine, tetramethylbutanediamine, tetramethylpentanediamine, tetramethylhexamethylenediamine, tetramethylheptane-diamine, tetramethyl-octanediamine, tetramethylnonanediamine, tetra-methyldecanediamine, ortho-phenylenediamine, meta-phenylenediamine, para-phenylenediamine, 4,4'-diaminodiphenylsulfone, diethylenetriamine, 1-(2-hydroxyethyl)piperazine, 1-(2-aminoethyl)piperazine, 4-(2-aminoethyl)-morpholine, 1-(2-pyridyl)-piperazine, 1-(2-aminoethyl)piperidine, 1-(3-aminopropyl)imidazole, melamine, and salts thereof.

In certain embodiments, the acid is selected from the group consisting of: boric acid, phosphoric acid, benzoic acid, formic acid, acetic acid, salicylic acid, phenol, and para-toluenesulfonic acid, and any combination thereof.

In certain embodiments, the cleaning solution further includes an auxiliary agent, and the auxiliary agent is selected from the group consisting of: ammonium dihydrogen phosphate, diammonium hydrogen phosphate, ethylenediaminetetraacetic acid, potassium sodium tartrate, sodium citrate, ammonium citrate, sodium gluconate, ammonium gluconate, and any combination thereof.

In certain embodiments, a molar ratio of the amine to the auxiliary agent ranges from 1:0.01 to 1:0.5. Preferably, the molar ratio of the amine to the auxiliary agent ranges from 1:0.01 to 1:0.3.

In certain embodiments, the conductive paste layer includes a carbon paste layer formed between the conductive polymer layer and the silver paste layer.

In another aspect, the present disclosure provides a capacitor element. The capacitor element includes a metal foil, an oxide layer, a surrounding barrier layer, a base layer, a conductive polymer layer, and a conductive paste layer.

The oxide layer is formed onto an outer surface of the metal foil. The surrounding barrier layer is surroundingly formed on an outer surface of the oxide layer so as to divide the outer surface of the oxide layer into a first part outer surface and a second part outer surface separated from each other. The base layer is formed on the second part outer surface of the oxide layer. The conductive polymer layer is formed on the base layer. The conductive paste layer is formed on the conductive polymer layer and the conductive paste layer includes the silver paste layer. The capacitor element has a leakage current lower than or equal to 450 μA and an equivalent series resistance lower than 29 mΩ measured at a condition of 25 V and 10 mA after being loaded at a temperature of 125° C. for 300 hours. In certain embodiments, the leakage current of the capacitor element is lower than or equal to 400 μA measured at a condition of 25 V and 10 mA after being loaded at a temperature of 125° C. for 300 hours. Preferably, the leakage current of the capacitor element is lower than or equal to 300 μA. More preferably, the leakage current of the capacitor element is lower than or equal to 250 μA.

In certain embodiments, a material of the base layer is synthesized by chemical polymerization, and the material of the base layer is polydioxyethylthiophene, self-doped polydioxyethylthiophene, polydioxy-ethylthiophene:polystyrenesulfonic acid composite or any combination thereof.

In certain embodiments, the capacitor element is manufactured by the method mentioned above, and the amine and the acid are attached onto the base layer.

In certain embodiments, the conductive paste layer includes a carbon paste layer formed between the conductive polymer layer and the silver paste layer.

Therefore, by virtue of "preparing the cleaning solution containing the amine and the acid" and "cleaning the base layer by the cleaning solution and then drying the base layer", the electrical properties of the capacitor element can be enhanced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
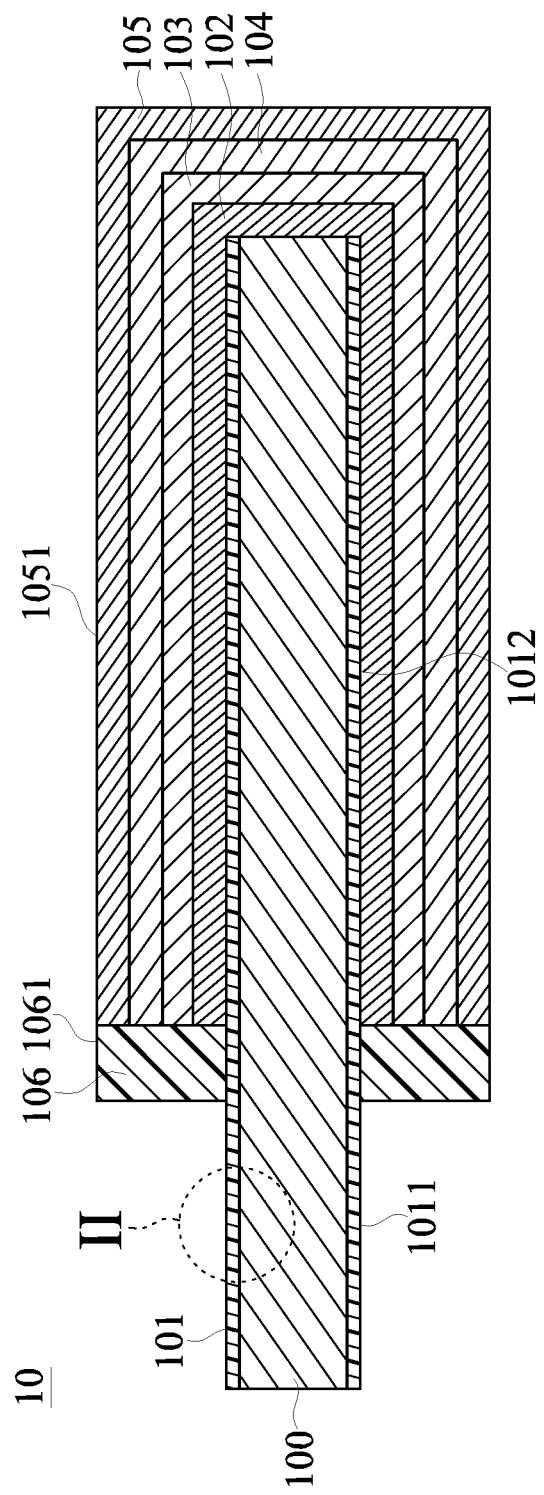
FIG. 1 is a cross-sectional side view of a capacitor element of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, a capacitor can be a capacitor element 10 in a stacked solid electrolytic capacitor package structure. The capacitor element 10 includes a metal foil 100, an oxide layer 101, a base layer 102, a conductive polymer layer 103, and a conductive paste layer.

Figure 2:
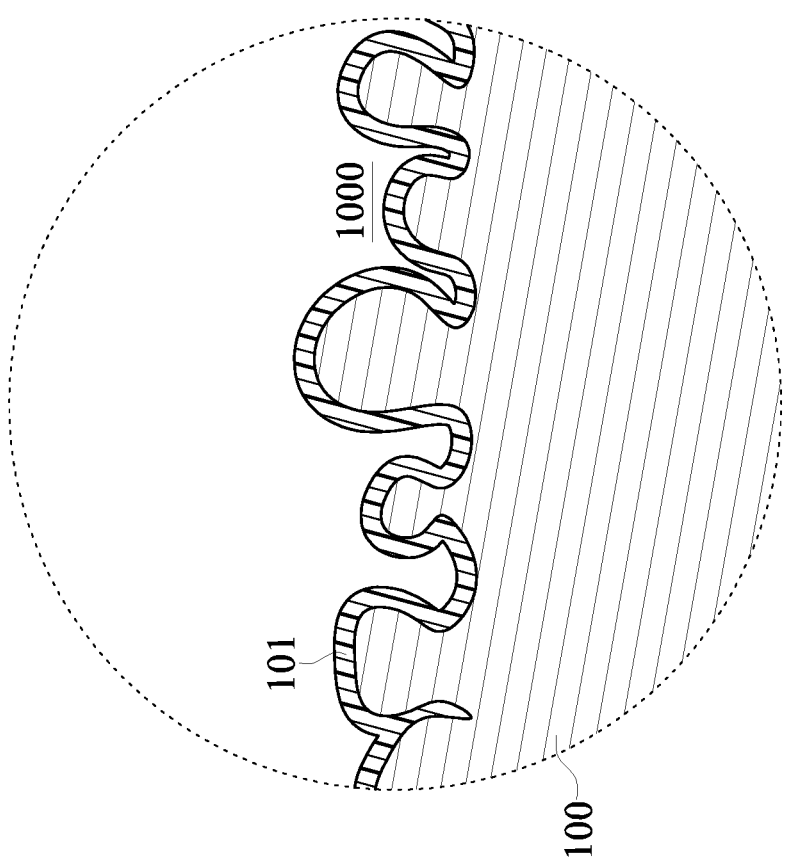
FIG. 2 shows an enlarged view of part II of FIG. 1.

According to different practical requirements, a material of the metal foil 100 can be aluminum, copper, or other metal materials. A porous corrosion layer is formed on an outer surface of the metal foil 100. In other words, the metal foil 100 can be a corrosion metal foil having the porous corrosion layer. An oxide layer 101 is formed on the outer surface of the metal foil 100, and the outer surface of the metal foil 100 is cladded by the oxide layer 101. Since the porous corrosion layer is formed on the outer surface of the metal foil 100, the oxide layer 101 is formed along the shape of the porous corrosion layer of the metal foil 100 as shown in FIG. 2. Microscopically speaking, micropores 1000 are concaves formed on the outer surface of the metal foil 100, and a part of the oxide layer 101 is formed in the micropores 1000 of the metal foil 100. The base layer 102 is disposed on an outer surface of the oxides layer 101 and the oxides layer 101 is partially encapsulated by the base layer 102. The conductive polymer layer 103 is disposed on the base layer 102. The conductive paste layer is disposed on the conductive polymer layer 103, and an outer surface of the conductive polymer layer 103 is completely encapsulated by the conductive paste layer. In brief, the oxide layer 101, the base layer 102, the conductive polymer layer 103, and the conductive paste layer are sequentially disposed on the outer surface of the metal foil 100 from inside to outside.

Specifically, the conductive paste layer includes at least a silver paste layer 105. The silver paste layer 105 can be directly disposed on the outer surface of the conductive polymer layer 103. In other embodiments, the conductive paste layer includes a carbon paste layer 104 and the silver paste layer 105 as shown in FIG. 1. The carbon paste layer 104 is disposed on the outer surface of the conductive polymer layer 103 and the outer surface of the conductive polymer layer 103 is completely encapsulated by the carbon paste layer 104. The silver paste layer 105 is formed on an outer surface of the carbon paste layer 104 and the outer surface of the carbon paste layer 104 is completely encapsulated by the silver paste layer 105. In other words, the conductive paste layer includes at least the silver paste layer 105. Further, the conductive paste layer can optionally include the carbon paste layer 104 which is disposed between the conductive polymer layer 103 and the silver paste layer 105.

In addition, referring to FIG. 1, the capacitor element 10 further includes a surrounding barrier layer 106. The surrounding barrier layer 106 is surroundingly formed on a part of the outer surface of the oxide layer 101, so that the outer surface of the oxide layer 101 is divided into a first part outer surface 1011 and a second part outer surface 1012 separated from each other. The base layer 102 is disposed on the second part outer surface 1012 of the oxide layer 101, and the second part outer surface 1012 of the oxide layer 101 is completely encapsulated by the base layer 102.

A distance between an outer peripheral surface 1061 of the surrounding barrier layer 106 and the oxide layer 101 is longer than, equal to, or shorter than a distance between an outer peripheral surface 1051 of the silver paste layer 105 and the oxide layer 101. Preferably, the distance between the outer peripheral surface 1061 of the surrounding barrier layer 106 and the oxide layer 101 is longer than or equal to the distance between the outer peripheral surface 1051 of the silver paste layer 105 and the oxide layer 101. In the present embodiment, the distance between the outer peripheral surface 1061 of the surrounding barrier layer 106 and the oxide layer 101 is equal to the distance between the outer peripheral surface 1051 of the silver paste layer 105 and the oxide layer 101. However, the present disclosure is not limited thereto.

In the present embodiment, an end of the base layer 102, an end of the conductive polymer layer 103, an end of the carbon paste layer 104, and an end of the silver paste layer 105 abuts upon the surrounding barrier layer 106 or spaced apart from the surrounding barrier layer 106. In a preferable embodiment, the end of the base layer 102, the end of the conductive polymer layer 103, the end of the carbon paste layer 104, and the end of the silver paste layer 105 abut upon the surrounding barrier layer 106, so that a length of the base layer 102, a length of the conductive polymer layer 103, a length of the carbon paste layer 104, and a length of the silver paste layer 105 are limited by the surrounding barrier layer 106. Furthermore, a material of the surrounding barrier layer 106 can be any conductive material, such as aluminum or copper, or any insulating material, such as epoxy resin or silicone resin, according to different practical requirements. However, the present disclosure is not limited thereto.

Figure 3:
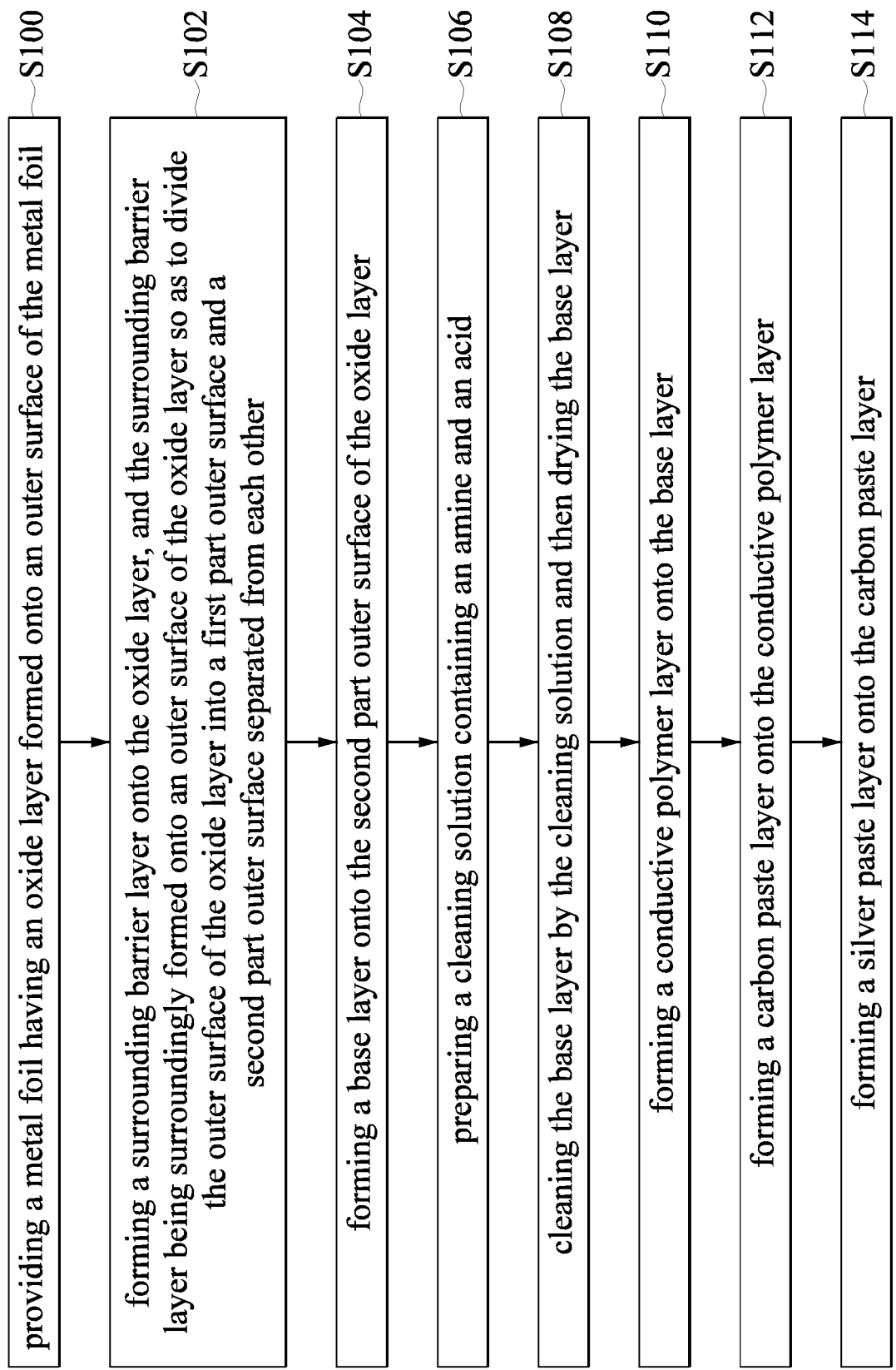
FIG. 3 is a flow chart of a method for manufacturing the capacitor element of a first embodiment of the present disclosure.

Referring to FIG. 1 and FIG. 3, the capacitor element 10 mentioned previously can be manufactured by a method of the first embodiment of the present disclosure illustrated in a flow chart shown in FIG. 3.

In step S100, a metal foil 100 is provided. The metal foil 100 is oxidized, and then an oxide layer 101 is formed onto an outer surface of the metal foil 100.

In step S102, a surrounding barrier layer 106 is formed onto the oxide layer 101. The surrounding barrier layer 106 is surroundingly disposed on a part of an outer surface of the oxide layer 101 so as to divide the outer surface of the oxide layer 101 into a first part outer surface 1011 and a second part outer surface 1012 which are separated from each other.

In step S104, a base layer 102 is formed onto the second part outer surface 1012 of the oxide layer 101, so that the oxide layer 101 is partially encapsulated by the base layer 102. A material of the base layer 102 is synthesized by chemical polymerization, and the material of the base layer 102 can be polydioxyethylthiophene, self-doped polydioxyethylthiophene, polydioxyethylthiophene:polystyrenesulfonic acid composite or any combination thereof.

In step S106, a cleaning solution is prepared. The cleaning solution includes an amine and an acid. In the present embodiment, a solid content of the cleaning solution ranges from 1.0 wt % to 25 wt %. In the cleaning solution, a molar ratio of the amine to the acid ranges from 1:0.3 to 1:0.7. By adjusting the molar ratio of the amine to the acid, the cleaning solution can have a better cleaning effect, so as to decrease a leakage current of the capacitor element 10 and enhance electrical properties of the capacitor element 10.

In the present embodiment, the amine has at least two amino groups. The amine can be a diamine having 2 to 10 carbon atoms, a triamine having 2 to 10 carbon atoms, a cyclic amine having 4 to 12 carbon atoms, an aromatic amine having 4 to 12 carbon atoms, or salts thereof. Specifically, the diamine having to 10 carbon atoms can be ethylenediamine, propylenediamine, butanediamine, pentanediamine, hexamethylenediamine, heptanediamine, octanediamine, nonanediamine, decanediamine, tetramethylethylenediamine, tetramethylpropanediamine, tetramethylbutanediamine, tetramethylpentanediamine, tetramethylhexamethylenediamine, tetramethylheptanediamine, tetramethyloctanediamine, tetramethylnonanediamine, tetramethyldecanediamine, ortho-phenylenediamine, meta-phenylenediamine, para-phenylenediamine, or salts thereof, but is not limited thereto. The triamine having 2 to 10 carbon atoms can be diethylenetriamine, but is not limited thereto. The cyclic amine having 4 to 12 carbon atoms can be piperazine, morpholine, piperidine, imidazole, or melamine, for example, 1-(2-hydroxyethyl)piperazine, 1-(2-aminoethyl)piperazine, 4-(2-aminoethyl)-morpholine, 1-(2-pyridyl)piperazine, 1-(2-aminoethyl)piperidine, 1-(3-aminopropyl)imidazole, or melamine, but is not limited thereto. The aromatic amine having 4 to 12 carbon atoms can be 4,4'-diaminodiphenylsulfone, but is not limited thereto.

In the present embodiment, the acid is a weak acid. Specifically, the acid is selected from the group consisting of: boric acid, phosphoric acid, benzoic acid, formic acid, acetic acid, salicylic acid, phenol, and para-toluenesulfonic acid, and any combination thereof. However, the example illustrated above is only one of the available embodiments and should not be taken as limiting the scope of the present disclosure.

In step S108, the base layer 102 is cleaned by the cleaning solution and then the base layer 102 is dried. The cleaning solution can remove metal ions and other impurities in the base layer 102. Generally speaking, when the based layer 102 is formed, the based layer 102 usually contains many metal ions and impurities which can cause an increase of the leakage current of the capacitor element 10 and a negative influence on electrical properties of the capacitor element 10. In the present embodiment, after being cleaned by the cleaning solution, the base layer 102 is dried at a temperature of 70° C. to 110° C. for 5 to 30 minutes, and then the cleaning step (S108) is completed. It should be noted that, after step S108, the amine and the acid in the cleaning solution are attached onto the base layer 102.

In step S110, the base layer 102 is immersed in a conductive polymer solution, and then a conductive polymer layer 103 is formed onto the base layer 102. A material of the conductive polymer layer 103 includes polyaniline (PAni), polypyrrole (PPy), polythiophene (PTh), and derivatives thereof. For example, the material of the conductive polymer layer 103 can be polydioxyethylthiophene, self-doped polydioxyethylthiophene, polydioxy-ethylthiophene:polystyrenesulfonic acid (PEDOT:PSS) composite or any combination thereof. The PEDOT:PSS composite has a good conductivity, and the PEDOT:PSS composite has a low polymerizing rate compared to other polymers (such as the PAni and the PPy), so that the difficulty in polymerizing the PEDOT:PSS composite at room temperature can be reduced.

It should be noted that the material of the conductive polymer layer 103 and the material of the base layer 102 can be the same or different. In other words, the base layer 102 and the conductive polymer layer 103 in the capacitor element 10 can be formed integrally or two independent layers. In addition, the base layer 102 and the conductive polymer layer 103 can be formed in the same way or in two different ways.

In step S112, a carbon paste layer 104 is formed onto the conductive polymer layer 103.

In step S114, a silver paste layer 105 is formed onto the carbon paste layer 104, and then the capacitor element 10 is obtained. Based on the total weight of a material of the silver paste layer 105 as 100 wt %, the material of the silver paste layer 105 contains 40 wt % to 90 wt % of silver powder, 0.1 wt % to 5 wt % of a dispersant, 1 wt % to 10 wt % of an aqueous resin, 5 wt % to 40 wt % of a solvent, and a remnant of water. However, the present disclosure is not limited thereto.

Figure 4:
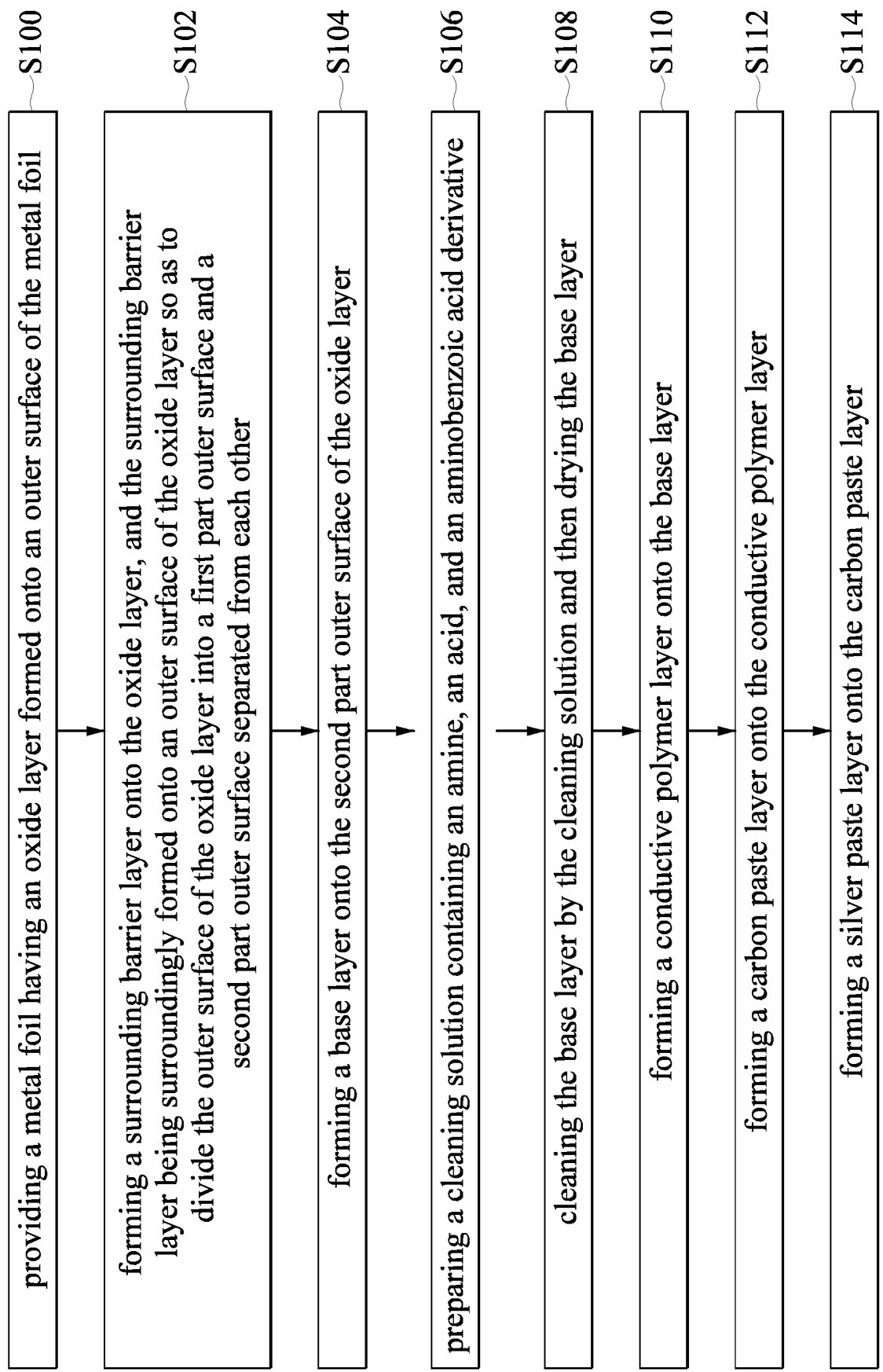
FIG. 4 is a flow chart of the method for manufacturing the capacitor element of a second embodiment of the present disclosure.

Referring to FIG. 1 and FIG. 4, FIG. 4 is a flow chart of the method for manufacturing the capacitor element 10 of the second embodiment of the present disclosure.

The method for manufacturing the capacitor element 10 of the second embodiment includes similar steps S100 to S114 illustrated in the first embodiment. The difference between the second embodiment and the first embodiment is that the cleaning solution in step S106 further includes an aminobenzonic acid derivative. The aminobenzonic acid derivative can further increase the cleaning effect of the cleaning solution to the base layer 102.

In the second embodiment, a solid content of the cleaning solution ranges from 1.0 wt % to 25 wt %. The aminobenzonic acid derivative can be at least one of substituted and unsubstituted aminobenzoic acid or aminophthalic acid. That is, the aminobenzonic acid derivative can have one carboxylic acid group or two carboxylic acid groups. For example, when the aminobenzonic acid derivative has one carboxylic acid group, the aminobenzonic acid derivative can be para-aminobenzoic acid, meta-aminobenzoic acid, or ortho-aminobenzoic acid. When the aminobenzonic acid derivative has two carboxylic acid groups, the aminobenzonic acid derivative can be para-dimethylaminobenzoic acid, 2-aminoterephthalic acid, 3-aminophthalic acid, 5-aminoisophthalic acid. However, the present disclosure is not limited thereto.

In other embodiments, the cleaning solution further includes an auxiliary agent. The addition of the auxiliary agent can help in removing the metal ions and impurities in the base layer 102. The auxiliary agent can be a metal chelating agent or a weak acid salt. For example, the auxiliary agent can be selected from the group consisting of: ammonium dihydrogen phosphate, diammonium hydrogen phosphate, ethylenediaminetetraacetic acid, potassium sodium tartrate, sodium citrate, ammonium citrate, sodium gluconate, ammonium gluconate, and any combination thereof.

In the cleaning solution, a molar ratio of the amine to the auxiliary agent ranges from 1:0.01 to 1:0.5. Preferably, the molar ratio of the amine to the auxiliary agent ranges from 1:0.01 to 1:0.3.

[Cleaning Effect Test]

In order to prove the effectiveness of the cleaning solution of the present disclosure, different cleaning solutions are prepared. The specific contents of the cleaning solutions of Examples 1 to 7 are listed in Table 1. The specific contents of the cleaning solutions of Comparative Examples 1 to 3 are listed in Table 2.

Specifically, the cleaning solutions of Examples 1 and 2 are prepared by adding an appropriate amount of acid into an amine solution with a concentration of 1M, so that the molar ratio of the amine to the acid is 1:0.5, and the preparation of the cleaning solutions in Examples 1 and 2 can be completed. The cleaning solutions of Examples 3 to 5 are prepared in the amine solution with a concentration of 1M and by adding an appropriate amount of acid according to the molar ratio of the amine to the acid of 1:0.5, and adding an appropriate amount of the auxiliary agent, so that the molar ratio of the amine to the auxiliary agent is 1:0.2, and the preparation of the cleaning solutions in Examples 3 to 5 can be completed. The cleaning solutions of Examples 6 and 7 are prepared by adding the appropriate amount of acid and the aminobenzonic acid with a concentration of 0.2M into an amine solution with a concentration of 0.8M, so that the molar ratio of the amine to the acid is 1:0.5, and after adding the appropriate amount of the auxiliary agent, the molar ratio of the amine to the auxiliary agent is 1:0.2, and the preparation of the cleaning solutions in Examples 6 and 7 can be completed.

In Comparative Examples 1 to 3, an amine solution with a concentration of 0.5M and an acid solution with a concentration of 0.5M are prepared respectively. In other words, the cleaning solutions used in Comparative Examples 1 to 3 include an independent amine solution and an independent acid solution which are used sequentially, instead of being a mixed solution that has the amine solution and the acid solution.

TABLE 1 specific contents of the cleaning solutions of Examples 1 to 7 (E1 to E7)

| | Cleaning solutions | | | |
|---|---|---|---|---|
| | Amine | Acid | Aminobenzoic acid | Auxiliary agent |
| E1 | Pentanediamine | Acetic acid | — | — |
| E2 | Tetramethyl-pentanediamine | Acetic acid | — | — |
| E3 | 1-(2-hydroxyethyl)piperazine | Benzoic acid | — | Ethylenediamine-tetraacetic acid |
| E4 | 1-(2-aminoethyl)piperidine | Salicylic acid | — | Sodium citrate |
| E5 | 1-(2-aminoethyl)piperazine | Phosphoric acid | — | Potassium sodium tartrate |
| E6 | 1-(2-aminoethyl)piperazine | Phosphoric acid | Para-aminobenzoic acid | Potassium sodium tartrate |
| E7 | 1-(2-aminoethyl)piperazine | Phosphoric acid | 5-amino-isophthalic acid | Potassium sodium tartrate |

TABLE 2 specific contents of the amine solution and the acid solution in the Comparative Examples 1 to 3 (C1 to C3)

| | Amine solution | Acid solution |
|---|---|---|
| C1 | Pentanediamine | Acetic acid |
| C2 | 1-(2-hydroxyethyl)piperazine | Benzoic acid |
| C3 | 1-(2-aminoethyl)piperidine | Phosphoric acid |

To prove the effectiveness of the cleaning solution of the present disclosure, the cleaning solutions of Examples 1 to 7 are used to clean the base layer 102. After being cleaned, the base layer 102 is dried at a temperature of 80° C. for 20 minutes and then cooled to room temperature. Subsequently, the cleaned base layer 102 is immersed in the conductive polymer solution, and then dried at a temperature of 125° C. for 30 minutes. After the capacitor element 10 is cooled to room temperature, a leakage current of the capacitor element 10 is measured at a condition of 25 V and 10 mA. The results of the leakage current of the capacitor element 10 are listed in Table 3.

TABLE 3 the leakage current results of the capacitor element after using the cleaning solutions of Examples 1 to 7

| | Leakage current |
|---|---|
| Uncleaned | 1130 μA |
| Example 1 | 890 μA |
| Example 2 | 786 μA |
| Example 3 | 604 μA |
| Example 4 | 650 μA |
| Example 5 | 620 μA |
| Example 6 | 420 μA |
| Example 7 | 318 μA |

According to the results of Table 3, a comparison between the uncleaned capacitor element and the cleaned capacitor element reveals that the cleaning solution of the present disclosure can remove the metal ions and impurities in the base layer 102 so that the leakage current of the capacitor element 10 can be effectively reduced.

[Electrical Property Test]

In order to prove that using the cleaning solution can enhance the electrical properties of the capacitor element 10, the base layer 102 is respectively cleaned by the cleaning solutions of Examples 1, 5, 6, and 7 and the cleaning solutions of Comparative Examples 1 to 3. After the base layer 102 is cleaned, the conductive polymer layer 103, the carbon paste layer 104, and the silver paste layer 105 are formed onto the base layer 102 in sequences, so that the capacitor element 10 can be obtained.

In particular, in Comparative Examples 1 to 3, the base layer 102 is cleaned by the acid solution, and then dried at a temperature of 80° C. for 20 minutes. Subsequently, the base layer 102 is cleaned by the amine solution, and then dried at a temperature of 80° C. for 20 minutes. After the cleaned base layer 102 is cooled to room temperature, the conductive polymer layer 103, the carbon paste layer 104, and the silver paste layer 105 are formed onto the base layer 102 in sequences, so as to obtain the capacitor element 10.

After the capacitor element 10 of Examples 1, 5, 6, and 7 and Comparative Examples 1 to 3 are packaged, a reliability test is carried out to measure the electrical properties of the packaged capacitor element. The electrical properties of the packaged capacitor element is measured at a condition of 25 V and 10 mA after the packaged capacitor element is loaded at a temperature of 125° C. for 300 hours. The results of the electrical properties are listed in Table 4.

TABLE 4 the results of the reliability tests of the packaged capacitor element of Examples 1, 5, 6, and 7 (E1, E5, E6, and E7) and Comparative Examples 1 to 3 (C1 to C3)

| | Equivalent series resistance (ESR) | Leakage current (LC) | Remarks |
|---|---|---|---|
| Uncleaned | — | — | Short circuit |
| E1 | 24 mΩ | 226 μA | — |
| E5 | 26 mΩ | 180 μA | — |
| E6 | 28 mΩ | 126 μA | — |
| E7 | 24 mΩ | 120 μA | — |
| C1 | 38 mΩ | 683 μA | — |
| C2 | 30 mΩ | 520 μA | — |
| C3 | 51 mΩ | 486 μA | — |

According to the results of Table 4, compared to Comparative Examples 1 to 3, the cleaning solution of the present disclosure can not only remove the metal ions and impurities but also enhance the electrical properties (reduce LC and ESR). Specifically, the leakage current of the capacitor element 10 of the present disclosure is lower than 450 μA and the equivalent series resistance of the capacitor element 10 of the present disclosure is lower than 29 mΩ.

In conclusion, the capacitor element 10 and the method for manufacturing the same have the technical features of "preparing the cleaning solution containing the amine and the acid" and "cleaning the base layer 102 by the cleaning solution and then drying the base layer 102", so that the electrical properties of the capacitor element 10 are enhanced.

Further, the capacitor element 10 and the method for manufacturing the same have the technical feature of "the cleaning solution further includes an aminobenzoic acid derivative", so that the leakage current of the packaged capacitor element can be decreased.

Further, the capacitor element 10 and the method for manufacturing the same have the technical feature of "the cleaning solution further includes an auxiliary agent", so that the cleaning effect of the cleaning solution to remove the metal ions in the base layer can be increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a capacitor element, comprising:
    providing a metal foil having an oxide layer formed on an outer surface of the metal foil;
    forming a surrounding barrier layer onto the oxide layer, and the surrounding barrier layer being surroundingly formed on an outer surface of the oxide layer so as to divide the outer surface of the oxide layer into a first part outer surface and a second part outer surface separated from each other;
    forming a base layer onto the second part outer surface of the oxide layer so as to partially encapsulate the oxide layer;
    preparing a cleaning solution containing an amine and an acid;
    cleaning the base layer by the cleaning solution and then drying the base layer;
    forming a conductive polymer layer onto the base layer; and
    forming a conductive paste layer onto the conductive polymer layer, and the conductive paste layer including a silver paste layer.

2. The method according to claim 1, wherein a material of the base layer is synthesized by chemical polymerization, and the material of the base layer is polydioxyethylthiophene, self-doped polydioxyethylthiophene, polydioxyethylthiophene:polystyrenesulfonic acid composite or any combination thereof.

3. The method according to claim 1, wherein the cleaning solution further includes an aminobenzoic acid derivative, and the aminobenzoic acid derivative is at least one of aminobenzoic acid and aminophthalic acid.

4. The method according to claim 3, wherein the aminobenzoic acid derivative is selected from the group consisting of: para-aminobenzoic acid, meta-aminobenzoic acid, ortho-aminobenzoic acid, para-dimethylaminobenzoic acid, 2-aminoterephthalic acid, 3-aminophthalic acid, 5-aminoisophthalic acid, and any combination thereof.

5. The method according to claim 1, wherein the amine has at least two amino groups, the acid is a weak acid, and a molar ratio of the amine to the acid ranges from 1:0.3 to 1:0.7.

6. The method according to claim 5, wherein the amine is at least one selected from the group consisting of: a diamine having 2 to 10 carbon atoms, a triamine having 2 to 10 carbon atoms, a cyclic amine having 4 to 12 carbon atoms, an aromatic amine having 4 to 12 carbon atoms, and salts thereof.

7. The method according to claim 6, wherein the amine is at least one selected from the group consisting of: ethylenediamine, propylenediamine, butanediamine, pentanediamine, hexamethylenediamine, heptanediamine, octanediamine, nonanediamine, decanediamine, tetramethylethylene-diamine, tetramethylpropanediamine, tetramethylbutanediamine, tetra-methylpentanediamine, tetramethylhexamethylenediamine, tetramethyl-heptanediamine, tetramethyloctanediamine, tetramethylnonane-diamine, tetramethyldecanediamine, ortho-phenylenediamine, meta-phenylene-diamine, para-phenylenediamine, 4,4'-diaminodiphenylsulfone, diethylene-triamine, 1-(2-hydroxyethyl)piperazine, 1-(2-aminoethyl) piperazine, 4-(2-aminoethyl)morpholine, 1-(2-pyridyl)piperazine, 1-(2-aminoethyl)-piperidine, 1-(3-aminopropyl)imidazole, melamine, and salts thereof.

8. The method according to claim 5, wherein the acid is selected from the group consisting of: boric acid, phosphoric acid, benzoic acid, formic acid, acetic acid, salicylic acid, phenol, para-toluenesulfonic acid, and any combination thereof.

9. The method according to claim 1, wherein the cleaning solution further includes an auxiliary agent, and the auxiliary agent is selected from the group consisting of: ammonium dihydrogen phosphate, diammonium hydrogen phosphate, ethylenediaminetetraacetic acid, potassium sodium tartrate, sodium citrate, ammonium citrate, sodium gluconate, ammonium gluconate, and any combination thereof.

10. The method according to claim 9, wherein a molar ratio of the amine to the auxiliary agent ranges from 1:0.01 to 1:0.5.

11. The method according to claim 1, wherein the conductive paste layer includes a carbon paste layer formed between the conductive polymer layer and the silver paste layer.

* * * * *